(12) United States Patent
Henkelmann

(10) Patent No.: US 7,677,645 B2
(45) Date of Patent: Mar. 16, 2010

(54) IMPACT PROTECTION REINFORCING ELEMENT AND METHOD OF PRODUCING THE ELEMENT

(75) Inventor: Hartmut Henkelmann, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 292 days.

(21) Appl. No.: 11/818,436

(22) Filed: Jun. 14, 2007

(65) Prior Publication Data

US 2008/0001434 A1    Jan. 3, 2008

(30) Foreign Application Priority Data

Jun. 14, 2006    (DE) .................. 10 2006 027 546

(51) Int. Cl.
*B62D 25/04* (2006.01)

(52) U.S. Cl. .................................. 296/187.12

(58) Field of Classification Search ............ 296/187.12, 296/187.2, 187.03, 187.05, 191, 193.03, 296/202, 203.02; 293/120
See application file for complete search history.

(56) References Cited

U.S. PATENT DOCUMENTS

| 6,315,326 | B1 | 11/2001 | Müller et al. |
| 6,503,585 | B1 | 1/2003 | Wagenblast et al. |
| 6,627,142 | B2 * | 9/2003 | Slaughter et al. ............ 264/510 |
| 2006/0011435 | A1 | 1/2006 | Yamaki et al. |
| 2008/0156425 | A1 * | 7/2008 | Howe et al. .................. 156/245 |

FOREIGN PATENT DOCUMENTS

| DE | 1956802 A1 | 11/1970 |
| DE | 1805363 B * | 5/1979 |
| DE | 197 13 760 A1 | 10/1998 |
| DE | 298 13 152 U1 | 11/1998 |
| DE | 198 12 288 C1 | 5/1999 |
| DE | 101 62 741 A1 | 7/2003 |
| DE | 102 53 300 A1 | 6/2004 |
| DE | 103 09 321 A1 | 10/2004 |
| DE | 10 2004 003 190 A1 | 9/2005 |
| DE | 102006058601 * | 6/2008 |
| EP | 0976620 A1 | 2/2000 |
| EP | 0995668 A1 | 4/2000 |
| EP | 1454819 A2 | 9/2004 |
| JP | 2000064505 A * | 2/2000 |
| JP | 2007064468 A * | 3/2007 |

OTHER PUBLICATIONS

European Search Report dated Apr. 8, 2008.

* cited by examiner

*Primary Examiner*—H Gutman

(57) ABSTRACT

An impact protection reinforcing element has at least one outer surface which is conformed to the contour of a surface of at least one vehicle body part in such a way that it may be positioned with extensive contact against the body part in the area of complementary construction and connected firmly to the body part. Provision is made for the impact protection reinforcing element to be formed of a fiber/plastics composite. A method of producing the impact protection reinforcing element uses an injection molding process.

14 Claims, 1 Drawing Sheet

IMPACT PROTECTION REINFORCING ELEMENT AND METHOD OF PRODUCING THE ELEMENT

CROSS-REFERENCE TO RELATED APPLICATION

This application claims the priority, under 35 U.S.C. § 119, of German application DE 10 2006 027 546.2, filed Jun. 14, 2006; the prior application is herewith incorporated by reference in its entirety.

BACKGROUND OF THE INVENTION

Field of the Invention

The invention relates to an impact protection reinforcing element having at least one outer surface which conforms to an contour of a surface of at least one vehicle body part in such a way that it may be positioned with extensive contact against the body part in the area of complementary construction and connected firmly to the body part.

It is known that automotive sector requirements with regard to passenger safety and thus to impact protection precautions are increasingly stringent. Such impact protection precautions may be active, for example through the provision of an airbag, or passive, for example through an increase in the buckling resistance or strength of load-bearing vehicle body elements. To increase the buckling resistance or strength of the vehicle body elements, the latter are preferably constructed at certain points with a greater wall thickness and/or with a higher moment of plane area. Such standard vehicle body elements thus fulfill the normal requirements with regard to passive impact protection.

In some economic regions or countries, however, requirements with regard to impact protection are more stringent than these. Series-produced vehicle body elements no longer meet these higher targets. In order, moreover, to enable cost-effective manufacture of the vehicle body parts, it has therefore become accepted to provide series-produced vehicle body parts with additional reinforcing elements, which, together with the vehicle body elements, exhibit such buckling resistance or strength that the requirements are fulfilled with regard to the more stringent safety regulations in these special economic regions. To this end, a BTR core, i.e. a material made from a high-strength press-hardened steel, is used, for example, in B-pillars of a motor vehicle. However, the use of such a steel core has the disadvantage of higher weight and high production costs when producing relatively small numbers of B-pillars due to relatively high plant costs.

Furthermore, it is conventional to use reinforcing plates, for example, to reinforce vehicle body elements. Published, non-prosecuted German patent application DE 101 62 741 shows such a B-pillar provided with reinforcing plates. In order to achieve the desired strength or rigidity values, it is necessary, however, to join the respective reinforcing plate to the vehicle body part by welding.

In addition, it is known to use glass fiber thermoplastics in the area of impact-absorbing components of motor vehicles. Thus, for example, a bumper crossbar is made from a glass fiber thermoplastic. In this embodiment, the bumper crossbar made from glass fiber thermoplastics is connected to the plastics adjacent thereto and form the bumper. In this embodiment, the glass fiber thermoplastics element merely fulfills the function of attaching an impact protection element that is not a component part of the vehicle body. The bumper crossbar made from glass fiber thermoplastics does not provide vehicle body support or absorb static forces.

SUMMARY OF THE INVENTION

It is accordingly an object of the invention to provide an impact protection reinforcing element and a method of producing the element which overcomes the above-mentioned disadvantages of the prior art devices and methods of this general type, which is simple and cheap to manufacture and which, while being of low weight, provides sufficient reinforcement for a vehicle body part in the event of an impact and is suitable for absorbing static forces.

An impact protection reinforcing element is provided and has at least one outer surface which is conformed to the contour of the surface of at least one vehicle body part in such a way that it may be positioned with extensive contact against the body part in the area of complementary construction and connected firmly to the body part. The impact protection reinforcing element is formed of a fiber/plastics composite.

Therefore the impact protection reinforcing element according to the invention is embodied in such a way that it may be firmly connected to a sheet metal vehicle body part, such as a door pillar for example. The impact protection reinforcing element is also embodied in such a way that at least one of its larger outer surfaces is mounted against a vehicle body part so as to cover a surface thereof. The firm connection between the vehicle body part and the impact protection reinforcing element results in an increase in the buckling resistance and the strength of the two connected-together parts and thus also a reinforcement of the vehicle body in the area of the vehicle body part for protecting the vehicle occupants in the event of an impact. Use of the fiber/plastics composite results in that the impact protection reinforcing element is of low weight. A further advantage of this embodiment is the fact that the impact protection reinforcing element formed of a fiber/plastics composite may be produced with relatively low fixed costs.

In particular, in an arrangement in which the vehicle body part is a load-bearing part, attachment of the impact protection reinforcing element additionally has the effect of increasing the static load-bearing capacity of the vehicle body part.

In an advantageous development, provision is made for the impact protection reinforcing element to be connectable in form-fitting manner to the vehicle body part. Therefore the shape of the impact protection reinforcing element is conformed to the shape of a vehicle body part or a plurality thereof in such a way that it rests against one or more vehicle body parts and is held firmly there against due to a particular embodiment of contours and shaped elements of the vehicle body part and thus also of the impact protection reinforcement element. Such a development is provided, for example, when an impact protection reinforcing element according to the invention is used as a core inside a motor vehicle B-pillar of substantially hollow construction. In this development, the impact protection reinforcing element is fixed at a particular position inside the B-pillar merely as a result of its shape.

Moreover, a preferred embodiment provides that the impact protection reinforcing element according to the invention may, in addition to the form-fitting connection, be bonded to one or more vehicle body parts. In this embodiment the impact protection reinforcing element is thus not only fixed to or in the vehicle body part by a form-fit but rather a bond additionally exists between impact protection reinforcing element and vehicle body part. Such a bond is conventionally produced by adhesion. To this end the impact protection reinforcing element according to the invention has an adhesion-promoting surface.

Advantageously, the impact protection reinforcing element is so shaped that it is at least partly conformed to the inner surface of an inner plate or, alternatively, to the inner surface of an outer plate of a B-pillar of a motor vehicle. As already mentioned above, it is advantageous to use the impact protection reinforcing element in the interior of a B-pillar of a motor vehicle. To save space and increase rigidity, the impact protection reinforcing element is therefore attached directly to the inner surface of an inner plate/outer plate of a B-pillar. In the event of an impact against the B-pillar, the latter deforms only as far as is allowed by its inherent rigidity and strength and the rigidity and strength of the impact protection reinforcing element attached inside it.

In a special embodiment, provision is made for the impact protection reinforcing element to be substantially a layer, which is conformed to the shape of the contact surface of the vehicle body part. When the impact protection reinforcing element is used, for example, in a B-pillar of a motor vehicle, the impact protection reinforcing element according to the invention has the same profile shape as the substantially concave inner plate or outer plate of the B-pillar.

In an alternative embodiment, provision may additionally also be made for the impact protection reinforcing element to be a hollow component, at least one of its outer sides being conformed to the contact surface of the vehicle body part. The external shape of the impact protection reinforcing element is embodied in such a way that it rests against at least one contact surface of at least one adjacent vehicle body part.

Alternatively, provision may also be made for the impact protection reinforcing element to take the form of a solid body. This embodiment provides maximum buckling resistance of the impact protection reinforcing element and thus also maximum buckling resistance of a B-pillar provided with the impact protection reinforcing element.

In a special development, provision is made for the impact protection reinforcing element to contain at least one measure for the mechanical attachment of further components. This is advantageous, in particular, when the impact protection reinforcing element is used in a B-pillar of a motor vehicle. In this case, threaded bores may for example be provided in the impact protection reinforcing element, in which hinge elements may be fastened to the impact protection reinforcing element by fastening measures such as, for example, screws through the outer plate or inner plate of a B-pillar. Additional plate-form stiffening elements are thereby dispensed with. In this embodiment the impact protection reinforcing element fulfills substantially three functions, namely the absorption of forces introduced by the hinge into the B-pillar and thus also into the impact protection reinforcing element, stiffening of the B-pillar plate against deformation introduced as a result of the hinge forces and, in addition, reinforcement of the B-pillar to provide impact protection.

Advantageously, provision is additionally made for the impact protection reinforcing element to contain at least one area in which it exhibits strength characteristics which are greater than those exhibited by the rest of the component. These areas with elevated strength characteristics may be disposed, for example, at the points at which hinges are attached. Moreover, such areas may also however be arranged at points where maximum loading is expected in the event of an impact.

Advantageously, this area with higher strength characteristics is produced by the introduction of at least one additional textile element into the fiber/plastics composite. The textile element, which preferably has a rectangular shape, is laminated onto or into the impact protection reinforcing element. The rectangular shape of the textile element brings about optimization of the textile blank.

Advantageously, the impact protection reinforcing element according to the invention exhibits different moments of plane area along its lengthwise direction. In order to minimize weight and to meet the strength requirements better in certain areas, it may be made thicker in certain areas for example, i.e. it may have a larger wall thickness, or indeed it may have larger distances between the individual outer surfaces in comparison with other portions of the impact protection reinforcing element.

In order to ensure good strength characteristics with low weight, provision is additionally made for the fibers of the impact protection reinforcing element to be oriented in the principal normal stress directions. This means that the fibers are oriented perpendicularly to the direction from which a possible impact on the vehicle body part provided with the impact protection reinforcing element is to be expected.

Advantageously, the fiber/plastics composite of the impact protection reinforcing element according to the invention contains at least one textile semi-finished product and a petrochemical matrix. The textile semi-finished product may contain just one biaxial glass fabric with different fiber components in the warp and weft directions. The petrochemical matrix may be a thermosetting epoxy resin.

According to the invention, the impact protection reinforcing element is produced by injection molding. Therefore a textile semi-finished product is placed in a mold, into which the petrochemical matrix is injected. The injection molding method offers the possibility of quick manufacture with a high level of quality.

In one special development of the method, a preform is first made from a textile semi-finished product in a compression mold and the preform is then joined to the petrochemical matrix in an injection mold. This additional method step has the advantage that a basic shape and at least rough dimensions have already been established for the impact protection reinforcing element to be produced before the preform is joined to the petrochemical matrix in the injection mold. Shaping of the preform in the compression mold may be accompanied by a temperature increase. Since the preform is near net shape, no superfluous area of fabric has to be joined to the petrochemical matrix in the injection mold. This brings about a reduction in production time, production costs and material costs. Once the work piece has been removed from the injection mold, it is cured by exposure to heat and then machined.

Advantageously, the injection molding method according to the invention is a resin transfer molding (RTM) method.

In one special embodiment of the method, provision is made for the fiber/plastics composite for the impact protection reinforcing element to be laminated directly into a vehicle body part and for the vehicle body part thus to be a mold constituent. In this embodiment, the vehicle body part thus constitutes an injection mold half, in which the textile semi-finished product is placed and then joined to the petrochemical matrix. The textile semi-finished product and the petrochemical matrix then cure directly in the vehicle body part. In this development of the method it may be provided that the impact protection reinforcing element to be produced is firmly joined to the vehicle body part immediately by lamination therein, or indeed that the impact protection reinforcing element may be taken back out of the vehicle body part serving as a mold after curing of the fabric to yield the impact protection reinforcing element and thus may subsequently be joined mechanically to this or indeed another similar vehicle body part or held and/or adhered form-fittingly therein.

Other features which are considered as characteristic for the invention are set forth in the appended claims.

Although the invention is illustrated and described herein as embodied in an impact protection reinforcing element and a method of producing the element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figures 1, 2:
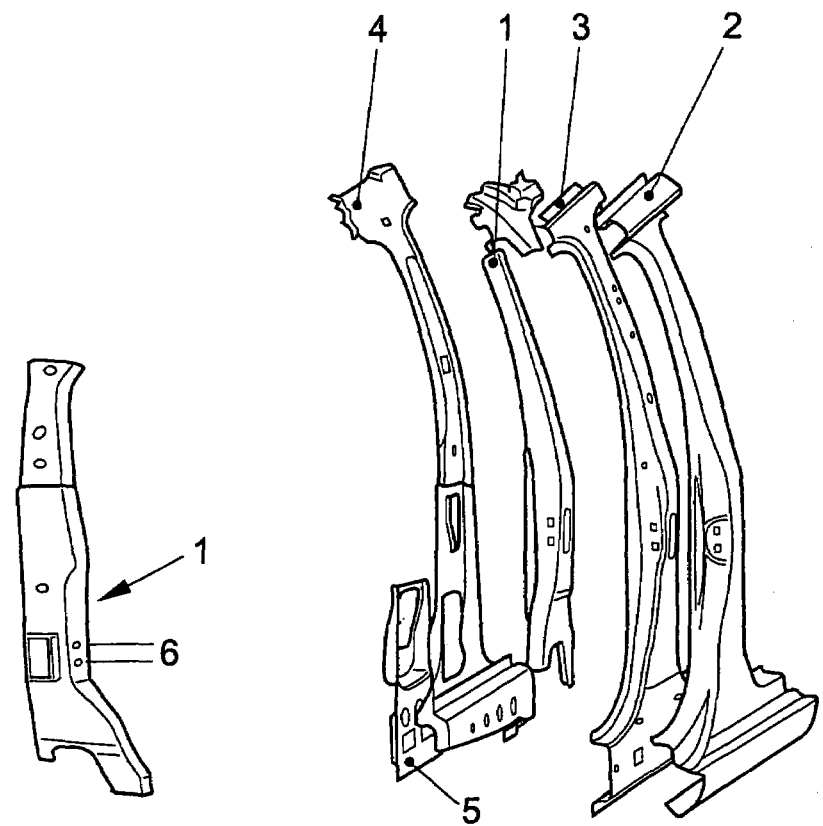
FIG. 1 is a diagrammatic, side view of an impact protection reinforcing element according to the invention.
FIG. 2 is an exploded, perspective view of the impact protection reinforcing element of a B-pillar of a motor vehicle.

Referring now to the figures of the drawing in detail and first, particularly, to FIG. 1 thereof, there is shown an impact protection reinforcing element 1 according to the invention. Measures for mechanical fastening of an attachment 6 are indicated in the impact protection reinforcing element 1.

FIG. 2 shows that a surface of the impact protection reinforcing element 1 is conformed to an inner surface of an inner plate of a B-pillar 3 in such a way that the surface of the impact protection reinforcing element 1 rests against the inner surface of the inner plate of the B-pillar 3 over all the individual contours of the surface.

The impact protection reinforcing element 1 may be inserted into a B-pillar of a motor vehicle in such a way that it is disposed between a B-pillar inner rear side part 4 and an inner plate of the B-pillar 3. An outer plate of the B-pillar 2 covers the inner plate of the B-pillar 3. Openings are indicated in the outer plate 2 and in the inner plate of the B-pillar 3, the openings corresponding to the position of the measures for mechanical fastening of an attachment 6 when the impact protection reinforcing element 1 has been inserted into the B-pillar. It is thus possible, when the impact protection reinforcing element 1 has been inserted, to pass fastening elements, for example for attaching hinges, through the openings in the outer plate of the B-pillar 2 and through the inner plate of the B-pillar 3 and to anchor them in the impact protection reinforcing element 1. Conventionally, the sheet metal parts illustrated in FIG. 2, namely the outer plate of the B-pillar 2, the inner plate of the B-pillar 3, the B-pillar inner rear side part 4 as well as an attachment for the automatic seatbelt mechanism 5 and a roof crossbeam reinforcing element 11 are welded together. Prior to welding of these stated components, the impact protection reinforcing element 1 is positioned between them.

Owing to the shape of the impact protection reinforcing element 1 being conformed to the shape of the inner plate of the B-pillar 3 and of the B-pillar inner rear side part 4, the impact protection reinforcing element 1 may be form-fittingly fixed and positioned between these stated components 3, 4. Therefore, due to the provision of certain shaped elements on the impact protection reinforcing element 1, the latter is clamped between the stated components 3, 4 in such a way that substantially all degrees of freedom are removed therefrom. The invention also covers developments in which no inner plate of the B-pillar 3 is present, such that the impact protection reinforcing element 1 rests with at least one of its surfaces directly against the inner surface of the outer plate of the B-pillar 2.

Advantageously, adhesion surfaces are provided between the contact surfaces on the impact protection reinforcing element 1 and the surfaces on the outer plate of the B-pillar 2 or on the inner plate of the B-pillar 3 and on the contact surfaces of the B-pillar inner rear side part 4, in order to bring about firmer fixing of the impact protection reinforcing element 1 to the stated components and vibration protection of the impact protection reinforcing element 1. If sufficiently strong adhesion is brought about, the impact protection reinforcing element 1 may likewise assume a load-bearing function in the vehicle body in addition to the B-pillar.

Non-illustrated hinge elements may be fixed on the impact protection reinforcing element 1 with fastening devices as described above in the measure for mechanical fastening of an attachment 6 through the outer plate of the B-pillar 2 and the inner plate of the B-pillar 3. The impact protection reinforcing element 1 thus fulfills the function of stabilizing the surface of the plates of the B-pillar 3, 4 in the case of hinge elements fastened thereto and at the same time likewise that of absorbing the forces introduced into the B-pillar by the hinge elements. Moreover, the impact protection reinforcing element 1 increases the buckling resistance of the entire B-pillar. The invention also extends to embodiments in which no measures are disposed for mechanical fastening of an attachment in the impact protection reinforcing element 1. In this embodiment, the impact protection reinforcing element 1 merely ensures stabilization of the B-pillar and support of the surfaces of the B-pillar, to which surfaces attachments are fastened.

Figure 3:
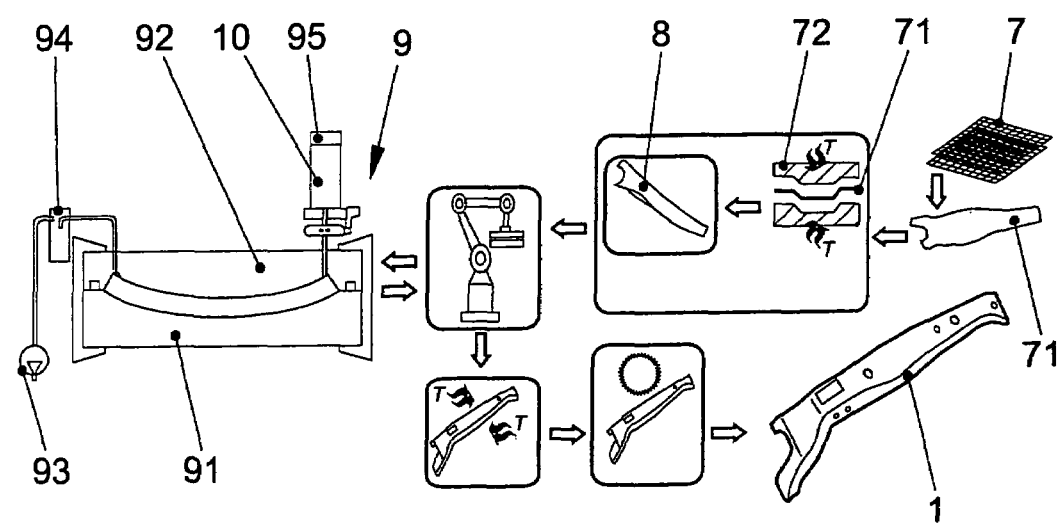
FIG. 3 is a schematic representation of the method of producing the impact protection reinforcing element according to the invention.

FIG. 3 schematically illustrates a method of producing the impact protection reinforcing element 1 according to the invention. In the method, first a textile semi-finished product 7 is preformed to yield a draped semi-finished product 71. The draped semi-finished product 71 is draped in a compression mold 72 and fixed therein. With exposure to heat, the draped semi-finished product 71 is preformed in the compression mold 72 to yield a preform 8. The preform 8 already exhibits substantially the rough final shape and final dimensions of the impact protection reinforcing element 1 to be produced. Then, the preform 8 is placed manually or by use of a manipulator into an injection mold 9. The injection mold 9 contains a lower mold half 91, an upper mold half 92, optionally a vacuum generator 93, a resin trap 94, together with a resin container 95, in which a petrochemical matrix 10 is stored. Once the preform 8 has been placed between the two mold halves 91, 92, the petrochemical matrix located in the resin container 95 is conveyed into the cavity between the two mold halves 91, 92, in which the preform 8 is already located, by a pressure difference. In this way, the fibers of the preform 8 are joined to the petrochemical matrix 10. Then, the preform 8 treated in this way is removed from the injection mold 9 and cured by a supply of heat. If necessary, post-machining is then performed, which produces the final shape and final dimensions of the impact protection reinforcing element 1 to be manufactured.

The invention claimed is:

1. An impact protection reinforcing element, comprising:
   an impact protection reinforcing element body formed of a fiber and plastics composite and having at least one outer surface conforming to a contour of a surface of at least one vehicle body part for being positioned with extensive contact against the vehicle body part in an area of complementary construction and connected firmly to the vehicle body part; and
   said impact protection reinforcing element body having at least one area with at least one additional textile element introduced therein and exhibiting strength characteristics greater than those exhibited by a rest of said impact protection reinforcing element body.

2. The impact protection reinforcing element according to claim 1, wherein said impact protection reinforcing element body connects in a form-fitting manner to the vehicle body part.

3. The impact protection reinforcing element according to claim 1, wherein said impact protection reinforcing element body is firmly connected in a bonded manner to the vehicle body part.

4. The impact protection reinforcing element according to claim 1, wherein said impact protection reinforcing element body is shaped to conform at least in part to an inner surface of an inner plate of the vehicle body part being a B-pillar.

5. The impact protection reinforcing element according to claim 1, wherein said impact protection reinforcing element body is shaped to conform at least in part to an inner surface of an outer plate of the vehicle body part being a B-pillar.

6. The impact protection reinforcing element according to claim 1, wherein said impact protection reinforcing element body is a layer conformed to a shape of the surface of the vehicle body part in contact therewith.

7. The impact protection reinforcing element according to claim 1, wherein said impact protection reinforcing element body is a hollow component having at least one outer side conforming to a shape of the surface of the vehicle body part in contact therewith.

8. The impact protection reinforcing element according to claim 1, wherein said impact protection reinforcing element body has a form of solid body with at least one outer side conforming to a shape of the surface of the vehicle body part in contact therewith.

9. The impact protection reinforcing element according to claim 1, wherein said impact protection reinforcing element body is configured for a mechanical attachment of components.

10. The impact protection reinforcing element according to claim 1, wherein said impact protection reinforcing element body exhibits different geometrical moments of inertia along a lengthwise direction.

11. The impact protection reinforcing element according to claim 1, wherein said fiber and plastics composite has fibers oriented in a principal normal stress direction.

12. The impact protection reinforcing element according to claim 1, wherein said fiber and plastics composite is composed of at least one textile semi-finished product and a petrochemical matrix.

13. The impact protection reinforcing element according to claim 12, wherein:
   said textile semi-finished product contains just one biaxial glass fabric with different fiber components in a warp and weft directions; and
   said petrochemical matrix is a thermosetting epoxy resin.

14. An impact protection reinforcing element, comprising:
   an impact protection reinforcing element body having at least one outer surface conforming to a contour of a surface of at least one vehicle body part for being positioned with extensive contact against the vehicle body part in an area of complementary construction and connected firmly to the vehicle body part; and
   wherein said impact protection reinforcing element body is formed of a fiber and plastics composite composed of at least one textile semi-finished product and a petrochemical matrix, and the textile semi-finished product contains just one biaxial glass fabric with different fiber components in a warp and weft directions, and said petrochemical matrix is a thermosetting epoxy resin.

* * * * *